(12) United States Patent
Poehler

(10) Patent No.: US 6,513,838 B2
(45) Date of Patent: Feb. 4, 2003

(54) CONNECTION OF DOUBLE-WALLED PIPES

(75) Inventor: Matthias Poehler, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 10/032,217

(22) Filed: Dec. 21, 2001

(65) Prior Publication Data

US 2002/0093195 A1 Jul. 18, 2002

(30) Foreign Application Priority Data

Dec. 22, 2000 (DE) .......................... 100 64 227

(51) Int. Cl.[7] .................................... F16L 19/00
(52) U.S. Cl. ........................ 285/123.15; 285/15
(58) Field of Search ........................ 285/15, 120.1, 285/123.1, 123.15

(56) References Cited

U.S. PATENT DOCUMENTS

| | | | | |
|---|---|---|---|---|
| 2,871,035 A | * | 1/1959 | Kaiser | 285/123.15 |
| 3,246,917 A | * | 4/1966 | Martin | 285/123.15 |
| 4,732,414 A | * | 3/1988 | Inaba | 285/123.15 |
| 5,934,334 A | * | 8/1999 | Gray, Jr. et al. | 285/123.1 |
| 5,961,153 A | * | 10/1999 | Foster | 285/15 |

* cited by examiner

*Primary Examiner*—Lynne H. Browne
*Assistant Examiner*—James M. Hewitt
(74) *Attorney, Agent, or Firm*—W. F. Fasse; W. G. Fasse

(57) ABSTRACT

A double-walled pipe connection for an aircraft fuel line includes a first outer pipe surrounding a first inner pipe, a second outer pipe surrounding a second inner pipe, a pipe coupling joining the inner pipes together, a securing fixture on the first inner pipe, a sleeve-shaped outer pipe bushing bolted to the securing fixture by bolts oriented parallel to a radial direction, and an outer pipe sleeve that is axially slidable over the second outer pipe and onto the outer pipe bushing. The first outer pipe is plugged into the outer pipe bushing, which is plugged into the outer pipe sleeve, which seals onto the second outer pipe. The inner pipe coupling is covered or exposed by axially moving the outer pipe sleeve, while the outer pipe bushing remains bolted to the first inner pipe, and mechanically secured and electrically grounded to a metal structure.

13 Claims, 2 Drawing Sheets

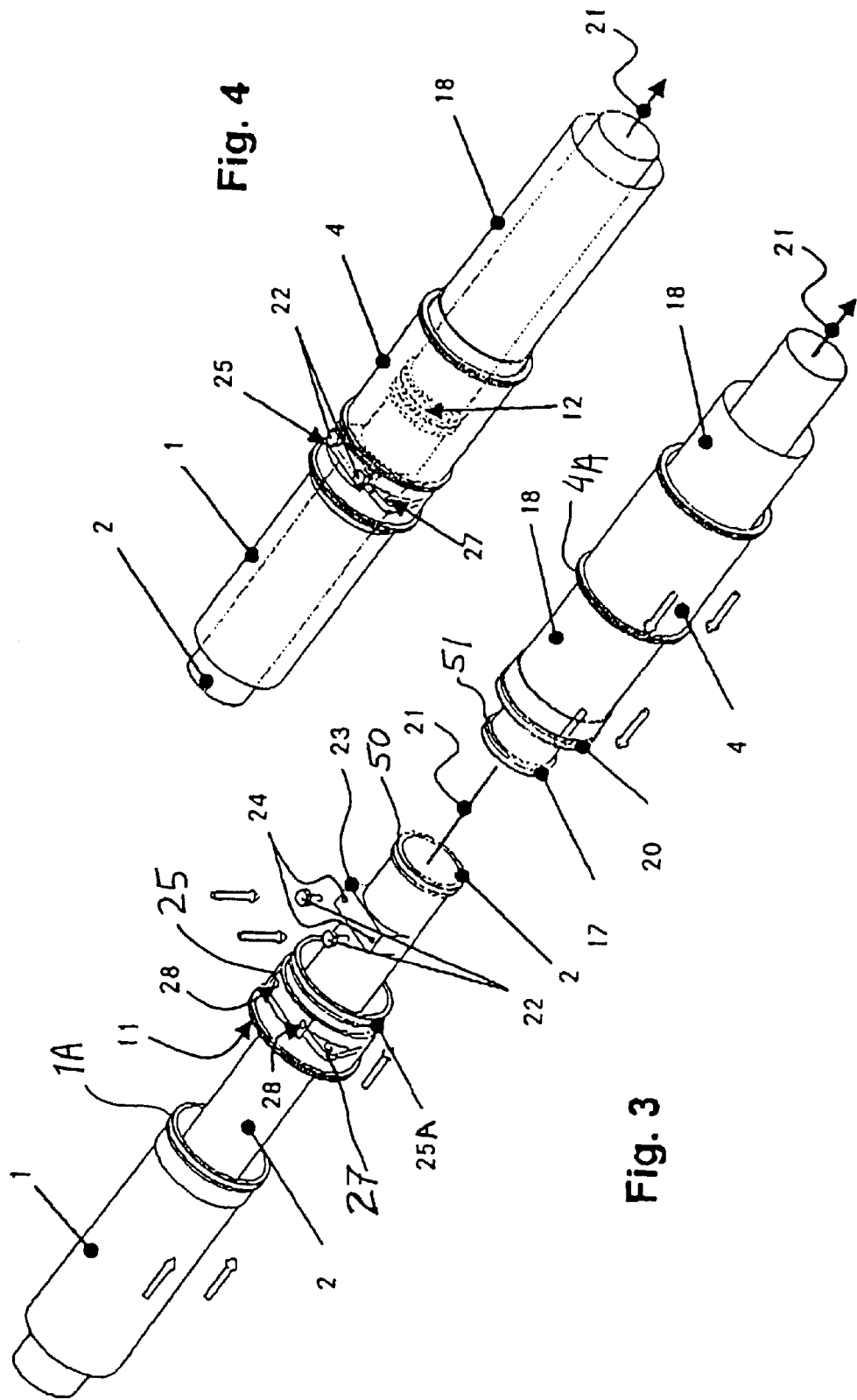

CONNECTION OF DOUBLE-WALLED PIPES

PRIORITY CLAIM

This application is based on and claims the priority under 35 U.S.C. §119 of German Patent Application 100 64 227.6, filed on Dec. 22, 2000, the entire disclosure of which is incorporated herein by reference.

FIELD OF THE INVENTION

The invention relates to an arrangement for coupling or connecting two double-walled pipes to each other. The double-walled pipes may especially be for conveying a liquid therein, such as fuel in an aircraft.

BACKGROUND INFORMATION

In various special applications, it has long been necessary to provide a high degree of safety and reliability of a pipe for conveying fluids therein. For example, in aircraft construction, such requirements apply to fuel lines, for which double-walled pipes including an inner pipe surrounded by an outer pipe have typically been used. It is also necessary to provide reliable trouble-free liquid-tight joints or connections of segments of the double-walled pipe to each other. Thereby, the double-walled pipe, such as a fuel line, can be rationally installed and maintained. In the event that seal elements included in the connections of these double-walled pipe segments lose their sealing ability over time, it must be possible to disassemble the pipe connection easily to allow the seal elements to be exchanged in an uncomplicated and economical manner. Moreover, it is necessary that the connection provides easy accessibility to the double-walled pipes for prophylactic inspection and maintenance, often in rather tight installation spaces. As a further requirement, especially in the context of aircraft fuel lines, the pipe connections must be electrically connected to a metal structure such as the aircraft airframe to provide an electrical conduction path, and especially a grounding path, and there must be no danger of an electrical line interruption between the pipe connection and the metal structure. Furthermore, it should not be necessary to carry out a repeated mechanical positioning, alignment or orientation of the double-walled pipe segments or the connection thereof, after carrying out any required maintenance procedures.

Connection arrangements for double-walled pipes of the above described general type are used, for example, in the trim tank fuel lines for modern aircraft such as the Airbus A300, A310, A330 and A340 aircraft. Such conventional trim tank fuel line connections, as shown in present FIGS. 1 and 2, will be described in detail below. While such a pipe connection has many benefits and advantages, it has also been found to suffer certain disadvantages in the context of installation and maintenance thereof. It is considered that the installation and maintenance requirements can be improved, because they have not been improved or economized, but rather have stayed essentially unchanged, over a long time span.

Due to the typical rather tight installation spaces for the trim tank fuel lines in an aircraft, it is difficult and inconvenient to access the fuel line installation for the purpose of inspection and maintenance. This makes it difficult to replace the seal elements of the conventional pipe connections in the event that the seal elements lose their sealing properties over time, for example due to the effects of aging of the seal material. Thus, improved accessibility for the purpose of maintenance and prophylactic inspection of the double-walled fuel lines and their connections is a highly desirable improvement.

Also, the conventional pipe connections do not reliably ensure that a constant electrical connection between the pipe line arrangement and the aircraft structure will be maintained at all times while carrying out maintenance procedures. This is necessary for continuously maintaining protection against lightning strikes and the like. Especially when carrying out a seal element exchange, which requires opening and disassembling the pipe connection, this procedure results in interrupting the electrical conduction path. Furthermore, with the conventional pipe connections, it is generally necessary to carry out a renewed positioning, aligning, or orienting of the pipe connection and the pipe segments after the maintenance work has been completed and the connection has been reassembled.

SUMMARY OF THE INVENTION

In view of the above, it is an object of the invention to provide an arrangement for connecting two double-walled pipes, which is improved in such a manner so that such pipes can be easily and rationally installed along a straight pipe-line path, especially in an aircraft, and which allows all installed seal elements to be exchanged in an uncomplicated manner in the event of leakage thereof. The invention also aims to provide an improved accessibility to the double-walled pipe installation and especially the connection thereof, for the purpose of prophylactic inspection and maintenance in tight installation spaces. Another object is to ensure that an electrical connection between the arrangement and the aircraft structure will be continuously maintained while carrying out maintenance procedures, e.g. to provide continuous lightning strike protection, and to avoid the need of re-positioning and re-aligning the pipe connection after completion of any maintenance work. The invention further aims to avoid or overcome the disadvantages of the prior art, and to achieve additional advantages, as apparent from the present specification.

The above objects have been achieved according to the invention in an arrangement for connecting a first double-walled pipe to a second double-walled pipe. The first double-walled pipe includes a first inner pipe surrounded, especially cylindrically coaxially surrounded, by a first outer pipe. The second double-walled pipe includes a second inner pipe surrounded, and especially cylindrically coaxially surrounded, by a second outer pipe. The pipes extend longitudinally along a longitudinal pipe axis. The ends of the first and second inner pipes are coupled with each other. A first outer pipe connection member or sleeve-shaped outer pipe flange is arranged axially movably around the first inner pipe (axially between the ends of the first outer pipe and the first inner pipe), and a second outer pipe connection member or sleeve is arranged axially movably around the second inner pipe and/or the second outer pipe. The sleeve-shaped first outer pipe flange and the second outer pipe sleeve are coupled and sealed to each other, preferably by a plug-in connection without mechanical fasteners such as bolts.

A securing fixture. e.g. including a fixing or securing body, is arranged on the outer surface of the first inner pipe, under or within the sleeve-shaped outer pipe flange. At least one threaded recess or blind hole is provided in the securing body, and extends with its hole axis along or parallel to a radial line extending radially relative to the longitudinal pipe axis. For example, the securing body may be a solid generally rectangular or parallelepiped block having an arched or saddle-shaped base surface with a contour that matches and is seated on the cylindrical outer surface of the first inner pipe, and having a flat planar top surface with the at least one threaded recess or blind hole therein.

At least one throughhole is provided in the sleeve-shaped first outer pipe flange, in alignment with the at least one threaded recess or blind hole in the securing body, in an assembled condition of the pipe connection arrangement. At least one threaded screw or bolt extends through the respective throughhole and is secured in the threaded recess or blind hole in the securing body, in the assembled condition of the pipe connection arrangement. The at least one screw extends along or parallel to a radial line extending radially relative to the longitudinal axis of the pipe. The term "screw" herein refers to all types of threaded fasteners. The sleeve-shaped first outer pipe flange may have a flat planar surface on one side on the outer surface thereof, through which the least one throughhole is provided, and further, a grounding connection point or lug connected thereto.

BRIEF DESCRIPTION OF THE DRAWINGS

In order that the invention may be clearly understood, it will now be described in connection with example embodiments, with reference to the accompanying drawings, wherein:

FIG. 3 shows a pipe connection arrangement for connecting two double-walled pipes according to the invention, in a disassembled or unconnected condition; and FIG. 4 shows the inventive pipe connection arrangement according to FIG. 3, but in the assembled and connected condition.

Figures 1, 2:
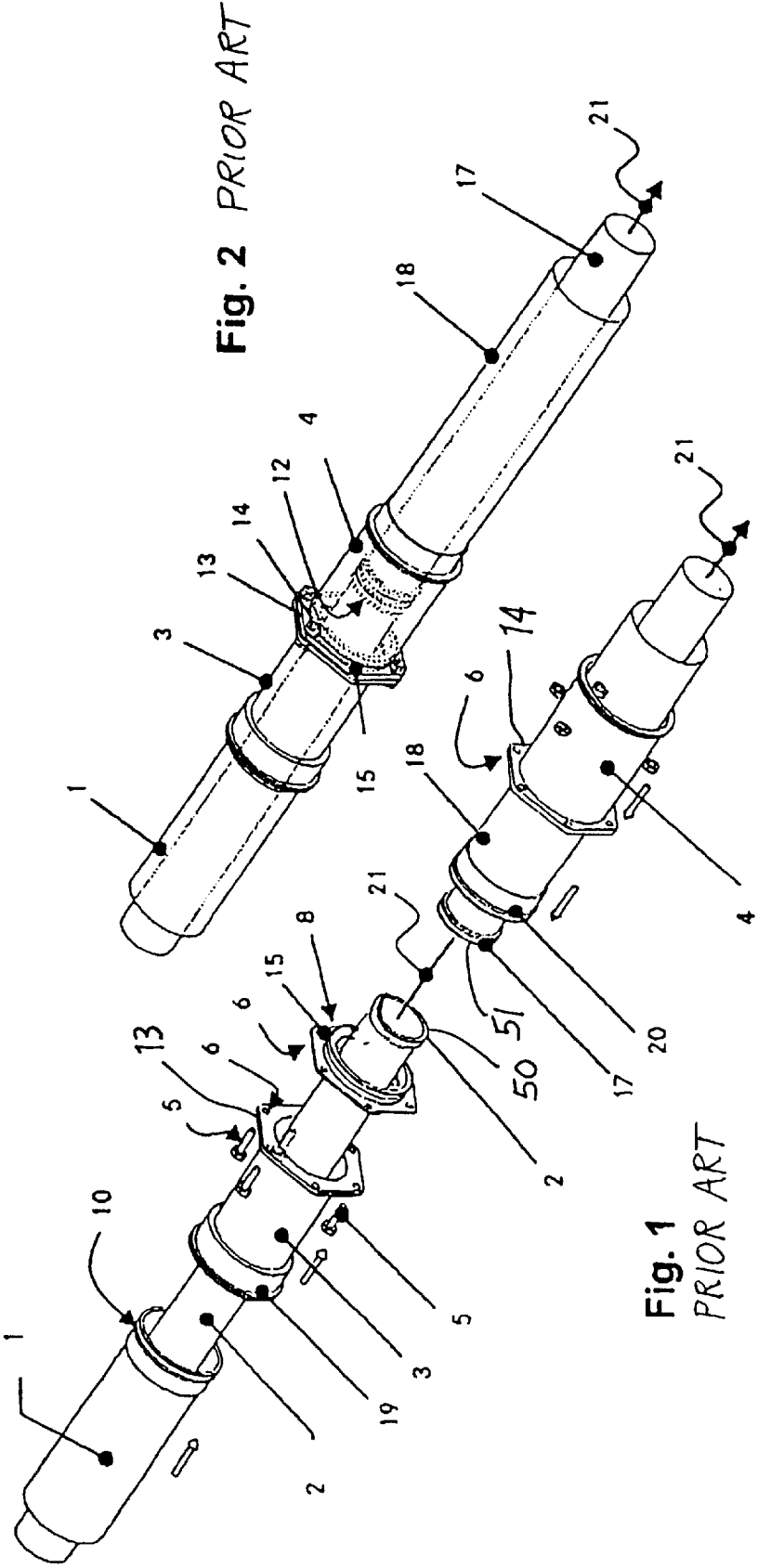
FIG. 1 shows a prior art arrangement for connecting two double-walled pipes to each other, in a disassembled or unconnected condition.
FIG. 2 shows the conventional pipe connection arrangement according to FIG. 1, but in the assembled or connected condition.

DETAILED DESCRIPTION OF PREFERRED EXAMPLE EMBODIMENTS AND OF THE BEST MODE OF THE INVENTION

The above discussion of background information relating to the present invention has already generally described the conventional pipe connection arrangement as shown in FIGS. 1 and 2, especially with regard to shortcomings or disadvantages that have been recognized in the conventional arrangement. This conventional arrangement will now be discussed in greater detail, to provide a general foundation for a better understanding of the inventive arrangement to be discussed below in connection with FIGS. 3 and 4.

FIG. 1 is a perspective view of the disassembled or disconnected condition of two double-walled pipes suitable for use as a trim tank fuel line in an aircraft, according to the prior art. The first double-walled pipe includes a first inner pipe 2 which conveys fuel therein, coaxially surrounded by a first outer pipe 1. Similarly, the second double-walled pipe includes a second inner pipe 17 that conveys the fuel therein, coaxially surrounded by a second outer pipe 18.

A first inner pipe sleeve or flange sleeve 3 surrounds the first inner pipe 2 adjacent to the first outer pipe 1, i.e. between the first outer pipe 1 and the junction end of the first inner pipe 2. The first inner pipe sleeve 3 has a first pipe flange 13 connected to and extending radially outwardly from an end thereof closest or adjacent to the junction end of the first inner pipe 2. A second outer pipe sleeve 4 is arranged axially movably around the second outer pipe 18 to selectively extend over the inner pipes 2 and 17, and has a second pipe flange 14 extending radially outwardly from the end thereof facing toward the first pipe flange 13. The first inner pipe sleeve or flange sleeve 3 is axially movable along the longitudinal pipe axis 21 around the first inner pipe 2. Similarly, the second outer pipe sleeve 4 is axially movable along the longitudinal pipe axis 21 relative to the second outer pipe 18.

Furthermore, a so-called annular ring flange 15, which is also known as a seal support flange or disk, is secured on the first inner pipe 2, for example being welded onto the outer surface of the pipe wall of the first inner pipe 2. In the assembled or connected condition, which will be further described below in connection with FIG. 2, this ring flange 15 serves as a connection element between the first pipe flange 13 and the second pipe flange 14, or actually as a support or transition element therebetween, and also as a connection element between the inner pipe 2 and the sleeves 3 and 4 (and therewith the outer pipes). All of these flanges, namely the pipe flanges 13 and 14, and the annular ring flange 15, each have a hexagonal perimeter, and a plurality of openings or holes 6 are distributed about the circumference of each of these flanges, respectively in positional alignment or registration with one another through the three flanges 13, 14 and 15.

The end of the flange sleeve or inner pipe sleeve 3 opposite the first pipe flange 13 is provided with a bushing collar or flared expansion 19, which may be pushed onto the outer wall portion 10 at the free end the first outer pipe 1 that is to be connected. A seal element (not shown in detail) is arranged on this pipe end region 10. Thereby, the inner pipe sleeve or flange sleeve 3 is tightly sealed and connected via the bushing collar 19 onto the end of the first outer pipe 1. Similarly, the pipe end region of the second outer pipe 18 that is to be connected further comprises a form of bushing collar 20, e.g. a flared or expanded sleeve collar portion. Axially moving the second outer pipe sleeve 4 along the second outer pipe 18 toward the inner pipe sleeve 3 will cause a narrower or constricted sleeve end portion of the outer pipe sleeve opposite from the second pipe flange 14 to catch or engage with the radially enlarged bushing collar 20, and therefore will establish a sealed joint and connection between the outer pipe sleeve 4 and the bushing collar 20 and therewith its connected second outer pipe 18.

The first and second inner pipes 2 and 17 are respectively provided with a coupling element 50, 51 in the form of a collar, rim or bell 50, 51 that is further equipped with a seal element or the like, whereby the two inner pipes 2 and 17 are axially connected to each other by these coupling elements 50 and 51 with an inner pipe coupling 12. The second outer pipe sleeve 4 in the assembled condition will surround and enclose the coupling area formed by the coupling elements 50 and 51 of the two inner pipes 2 and 17, i.e. the inner pipe coupling 12, insofar as the side or end face of the second pipe flange 14 of the second outer pipe sleeve 4 will lie against the annular ring flange 15, which is secured (e.g. welded) to the first inner pipe 2 as described above.

The components shown in FIG. 1 and described above are assembled to complete the connection as shown in FIG. 2 in the following manner. The inner pipe sleeve 3 and the second outer pipe sleeve 4 are each respectively moved in the axial direction parallel to the longitudinal pipe axis 21 toward and against the annular ring flange 15 until the side or end flange surfaces of the first and second pipe flanges 13 and 14 come into contact with and lie against the opposite side faces of the ring flange 15, with suitable seal elements 8 inserted therebetween. The seal elements 8, such as so-called O-rings, are pressed between the annular ring flange 15 on the one hand and the side faces of the first and second pipe flanges 13 and 14 on the other hand respectively. A respective securing screw or bolt 5 that extends parallel to the pipe longitudinal axis 21 is respectively inserted through each one of the aligned openings or holes 6 in the flanges 13, 14 and 15 as described above. The plural screws or bolts 5 may then be secured by washers and threaded nuts. Thereby, the pipe flanges 13 and 14 are secured to each other with the intervening ring flange 15 and the O-ring seal elements 8 interposed therebetween. The seal elements such as O-rings 8 also provide a seal between the respective associated outer pipe and inner pipe. Furthermore, at least two of these screws or bolts 6 secured to the flanges are further used for securing the arrangement to the metal aircraft structure, to provide a secured mechanical mounting attachment thereof as well as an electrical grounding connection.

In the event that any of the seal elements such as O-rings 8 loose their seal properties and begin to leak over time, it will be necessary to loosen and remove all of the screws or bolts 6 in order to remove the second pipe flange 14 of the outer pipe sleeve 4 from the annular ring flange 15 that holds the pipe, so as to expose and access the various seal elements. By removing the screws 6, it is a direct unavoidable result that the electrical conducting connection from the pipe connection arrangement to the aircraft structure, for example for lightning strike protection in the manner of voltage dissipation or compensation, is interrupted. In a particularly disadvantageous situation, it will further be necessary to completely remove and disassemble the connection of the second outer pipe 18 on the second outer pipe sleeve 4 so as to remove the second outer pipe 18.

Since the above described pipe connection arrangement, and the electrical connection established thereby, comprise several separate elements with several distinct junction locations, after the complete pipe connection arrangement has been disassembled and then reassembled into the connected condition, and the grounding conduction connection with the aircraft structure has again been established, it will be necessary to once again repeat the positioning, alignment, or orienting of this pipe connection arrangement. This process requires rather complicated and difficult work steps, especially when one considers that the procedure and the necessary work steps must generally be carried out in a rather tight and inaccessible installation space.

It should be understood that the conventional arrangement described in connection with FIGS. 1 and 2, as well as the inventive arrangement that will be described next in connection with FIGS. 3 and 4, further include various components such as seal rings, washers, securing or safety wires, and the like, which complete the respective arrangement, but which are not shown in the drawings for the sake of simplicity. Such minor detail components can be embodied and arranged in any conventionally known manner for serving the required purpose or function in the respective arrangement.

The inventive pipe connection arrangement will now be described with regard to an example embodiment shown in FIGS. 3 and 4. Many components of the inventive arrangement according to FIGS. 3 and 4 correspond to those of the conventional arrangement according to FIGS. 1 and 2, and are accordingly identified by the same reference numbers as in FIGS. 1 and 2. A detailed description of these components will not be repeated here.

In general, it is apparent that the inventive arrangement includes a first double-walled pipe with a first inner pipe 2 surrounded by a first outer pipe 1, and a second double-walled pipe with a second inner pipe 17 surrounded by a second outer pipe 18. These pipe components all extend coaxially along the longitudinal pipe axis 21. The inventive arrangement further includes a second outer pipe sleeve 4 surrounding the second outer pipe 18, but without the (prior art) second pipe flange 14 that was provided on the end of the second outer pipe sleeve 4 that was to be secured at the connection plane according to the prior art arrangement of FIGS. 1 and 2. The annular ring flange 15 of the prior art arrangement of FIGS. 1 and 2 has been entirely omitted from the inventive arrangement of FIGS. 3 and 4. Furthermore, the inner pipe sleeve or flange sleeve 3 with its bushing collar 19 and its first pipe flange 13 at opposite ends thereof according to the prior art FIGS. 1 and 2, has been entirely omitted from the inventive arrangement of FIGS. 3 and 4. In this context, the screw connection of the prior art flanges 13, 14 and 15 by means of the axis-parallel screws 5 has also been omitted. The inventive arrangement of FIGS. 3 and 4 does, however, include a respective seal element extending circumferentially around the pipe end regions of the two outer pipes 1 and 18 that are to be connected to each other.

The first and second inner pipes 2 and 17 are provided on the free ends thereof with coupling rims, flanges, or bells 50 and 51 respectively with suitable seal elements, by which the inner pipes 2 and 17 are coupled and sealed to each other in the connected condition by way of an inner pipe coupling 12 as shown in FIG. 4. This inner pipe coupling 12, with the rims, flanges or bells 50 and 51 and any suitable seal elements, can be carried out in any conventionally known manner for joining and sealing together two pipe ends. For example, the inner pipe coupling 12 can be embodied as a pipe flange clamp, a pipe muff or cuff, or the like, including a seal element and mechanical coupling components. Thereby, a liquid-tight connection is formed, so that a liquid such as fuel can be conveyed through the inner pipes 2 and 17.

One of the inner pipes, such as the first inner pipe 2 in the present example of the invention, is further provided with a securing fixture, e.g. a fixing or securing body 23 that is arranged on the circumferential outer surface of the pipe wall of the first inner pipe 2 in an end region proximate the end rim flange or bell 50, e.g. between the end of the first outer pipe 1 and the end of the first inner pipe 2. While the securing body 23 is provided on the first inner pipe 2 in the present example embodiment, it could alternatively be provided on the second inner pipe 17 with an adaptation of the other components.

The securing body 23 is generally a rectangular or quadratic shaped body, for example a substantially parallelepiped-shaped body, having a base surface that extends generally parallel and coaxially relative to the longitudinal pipe axis 21, and that has a shape and size matching the outer diameter and the circumferential shape of the outer surface of the first inner pipe 2. The correspondingly shaped base surface of the securing body 23 is arranged or mounted on the outer wall surface of the first inner pipe 2, for example by being welded, brazed, adhesively bonded, clamped, or otherwise mechanically secured thereon, or by being integrally formed with the pipe wall itself. As an example, the securing body 23 may include, in addition to the block-shaped body, a clamping strap or a U-bolt. that extends around the opposite side of the first inner pipe 2 and clampingly secures the block-shaped body against the second inner pipe 2. The top surface or radially outwardly facing surface of the securing body 23 is preferably a generally flat planar surface extending parallel to a plane tangent to the outer circumference of the first inner pipe 2.

At least one, and in the present example two, threaded recesses or blind holes 24 (or alternatively open throughholes passing entirely through the height of the block-shaped body) are provided in the securing body 23, and particularly as cylindrical bore holes in the flat planar outer surface thereof. Preferably, these threaded holes 24 have a defined limited blind depth extending into the block-shaped body 23 respectively along hole axes that extend along or parallel to a radial line extending radially relative to the longitudinal pipe axis 21 and perpendicularly to the flat planar top surface of the securing body 23. The inner cylindrical hole wall of each of these blind holes 24 is provided with a suitable internal female threading.

The inventive pipe connection arrangement further includes a first pipe connection member in the form of a sleeve-shaped first outer pipe flange 25. This outer pipe flange 25 could also be regarded as a sleeve bushing that forms a junction for and between the first outer pipe 1 and the second outer pipe sleeve 4 as will be described below. In the assembled and connected condition shown in FIG. 4, the outer pipe flange or sleeve bushing 25 covers and encloses the securing body 23 within itself, i.e. between itself and the first inner pipe 2. The pipe flange or sleeve bushing 25 has at least one, and in the present embodiment two, throughholes 28 passing therethrough, in alignment and the same directional orientation with the threaded blind holes 24 in the securing body 23, in the assembled and connected condition shown in FIG. 4. Two threaded screws or bolts 22 are inserted through the throughholes 28 and screwed into the threaded blind holes 24 in the securing body 23, so as to mechanically secure the outer pipe flange or sleeve bushing 25 onto the securing body 23, and thereby onto the first inner pipe 2. To seal the screwed or bolted connection, seal washers are used together with the bolts or screws 22.

The outer pipe flange or sleeve bushing 25 further has a ground connection point or grounding lug 27 provided on the outside surface thereof. This grounding lug 27 is directly secured, e.g. bolted or screwed, to the metal airframe structure of the aircraft and thereby provides an electrical protective measure, and especially a grounding and potential compensating conduction path that provides, e.g., lightning strike protection for the inventive pipe connection arrangement. The grounding lug 27 is laterally or circumferentially offset from the throughholes 28 and the screws or bolts 22, for easy access. By this direct mechanical and electrical connection of the outer pipe flange or sleeve bushing 25 to the metal aircraft structure, a mechanical mounting and electrical grounding of the inventive double-walled pipe connection arrangement is achieved and reliably ensured independently of the sealed connection and assembly of the pipe components.

As mentioned above, in the assembled condition, the outer pipe flange or sleeve bushing 25 joins the first outer pipe 1 and the second outer pipe sleeve 4 together. For this purpose, the joining end of the first outer pipe 1 has a male plug-in junction end 1A provided with a suitable seal element, and the first outer pipe flange or sleeve bushing 25 has a female bushing collar or bell 11 that is mechanically pushed over the male plug-in junction end 1A of the first outer pipe 1 in the assembled condition as shown in FIG. 4. Namely, the end 1A of the first outer pipe 1 is mechanically coupled by being plugged into the female bushing collar or bell 11 of the first outer pipe flange or sleeve bushing 25.

On the other side of the connection, the female bushing collar or bell 4A of the second outer pipe sleeve 4 is pushed onto and thereby mechanically joined and sealed onto the male plug-in end 25A, with a suitable seal element, on the opposing end of the sleeve-shaped first outer pipe flange or sleeve bushing 25. Thus, the first outer pipe 1 is mechanically plugged and joined into the outer pipe flange or sleeve bushing 25, which in turn is mechanically plugged into and joined with the second outer pipe sleeve 4 in the connected condition shown in FIG. 4. At the same time, the bushing collar 20 with a seal element, at the free end of the second outer pipe 18 engages and seals into the narrower end of the second outer pipe sleeve 4 opposite its expanded bushing collar 4A. Thereby, the second outer pipe sleeve 4 covers the underlying junction of the two inner pipes 2 and 17 by the inner pipe coupling 12 in the connected condition shown in FIG. 4.

The second outer pipe sleeve 4 may be freely axially moved back and forth relative to the sleeve-shaped outer pipe flange or sleeve bushing 25 and the second outer pipe 18, to selectively form a closed junction that covers the inner pipe coupling 12 as shown in FIG. 4, or opens this junction area to expose the inner pipe coupling 12. To achieve this selective opening or closing of the second outer pipe sleeve 4, it is not necessary to release or fasten, respectively, any screws or other secured connections. Instead, the second outer pipe sleeve 4 can simply be moved axially back and forth between the closed position and the opened position, whereby the above described plug-in sealed joints are formed in the closed position as shown in FIG. 4. Thereby, the pipe flange or sleeve bushing 25 also forms a connection element between the two outer pipes 1 and 18.

In the routine maintenance of the pipe line, it will be necessary to inspect the pipe connection arrangement at regular intervals, and to replace the seal rings at the various junctions between the pipe components, e.g. the seal rings of the second outer pipe 18 and the seal rings of the two inner pipes 2 and 17, in the event that these lose their sealing ability over time. In order to inspect the pipe connection arrangement, or to replace the seal rings, it is simply necessary to push/slide the second outer pipe sleeve 4 axially off of the sleeve-shaped outer pipe flange or sleeve bushing 25 and simultaneously off of the bushing collar 20 of the second outer pipe 18. This is a simple mechanical sliding operation, because the connections are simple mechanical plug-in connections as described above, and it is not necessary to remove any screws or other mechanical fasteners. By simply sliding away the outer pipe sleeve 4 in this manner, the inner pipe coupling 12 of the two inner pipes 2 and 17 is exposed for inspection, and for replacement (if necessary) of the inner pipe coupling 12 or the seals thereof, or the seals of the outer pipe flange or sleeve bushing 25, the bushing collar 20 of the second outer pipe 18, or the like.

During this maintenance operation, the outer pipe flange or sleeve bushing 25 can remain securely bolted to the securing body 23 by the screws or bolts 22. Also, the outer pipe flange or sleeve bushing 25 remains securely connected via the grounding lug 27 to the metal aircraft structure, so that a mechanical attachment and positioning as well as an electrical safety grounding of the pipe connection arrangement is continuously maintained even while inspecting or replacing the seal elements. Thereby, it does not become necessary to carry out a renewed positioning and alignment of the pipe components after performing such an inspection or replacement of the seal elements. If it becomes necessary to replace the seal washers that seal the screws or bolts 22, these bolts 22 may be simply removed (even only one at a time) to replace the seal washers, without opening or disconnecting the pipe connection arrangement. During this operation, the grounding lug 27 also remains connected to the aircraft structure to provide mechanical positioning and electrical grounding.

In addition to the above advantages, the total number and complexity of the various components of the pipe connection arrangement is significantly reduced in comparison to the prior art of FIGS. 1 and 2. Also, the accessibility of this pipe connection arrangement is also considerably improved, because all of the screw or bolt connections, e.g. the bolts 22 and the grounding lug 27 are all directly visible and exposed without requiring disconnection, disassembly or opening of the connection arrangement. Also, a direct inspection of the fuel-conveying inner pipe coupling can be carried out without needing to open any screw or bolt connections.

The present example embodiment of FIGS. 3 and 4 simply shows one possible manner of mechanically securing the outer pipe flange or sleeve bushing 25 to the first inner pipe 2, namely by the two bolts 22 extending parallel to a radial plane. Alternatively, this mechanical connection could be achieved by two bolts extending radially on respective opposite sides of the pipe arrangement, or a plurality of bolts extending on respective radial lines in a star pattern around the circumference of the pipe arrangement, or with an asymmetrical arrangement of the securing bolts, or an arrangement of two or more securing bolts offset axially from one another.

The several joints established by the inventive pipe connection arrangement have been shown and described with an exemplary arrangement of male pipe ends and female sleeve ends forming each respective joint. The provision of male and female mating ends can be reversed. For example, the first outer pipe 1 could alternatively have a female end in the form of a bushing collar, while the outer pipe flange or connection sleeve 25 would then have a mating male end (rather than the female bushing collar 11) to mate and join with the female end of the first outer pipe 1. A reversal of the male and female ends could also be applied to the opposite side of the outer pipe flange 25 and the associated mating end of the outer pipe sleeve 4.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A double-walled pipe connection arrangement comprising:

a first inner pipe that has a first junction end, and that extends along a longitudinal pipe axis;

a first outer pipe that has a first outer pipe end, and that is arranged surrounding at least a portion of said first inner pipe;

a second inner pipe that has a second junction end releasably joined to said first junction end of said first inner pipe;

a second outer pipe that has a second outer pipe end, and that is arranged surrounding at least a portion of said second inner pipe;

a securing fixture that is stationarily arranged on said first inner pipe between said first junction end and said first outer pipe end, and that has at least one internally threaded hole therein;

a first pipe connection member that surrounds said securing fixture and a portion of said first inner pipe between said first outer pipe end and said first junction end, that has at least one throughhole therein respectively in alignment with said at least one internally threaded hole in said securing fixture, and that is joined to said first outer pipe end;

a threaded screw that passes through said throughhole and is thread-engaged into said internally threaded hole so as to secure said first pipe connection member to said securing fixture, wherein said threaded screw has a longitudinal screw axis oriented along or parallel to a radial line extending radially relative to said longitudinal pipe axis; and a second pipe connection member that surrounds said joined first and second junction ends of said first and second inner pipes, and that is respectively joined to said second outer pipe end and said first pipe connection member.

2. The double-walled pipe connection arrangement according to claim 1, wherein said at least one internally threaded hole includes at least two threaded blind holes extending with hole axes thereof oriented along or parallel to said radial line.

3. The double-walled pipe connection arrangement according to claim 1, wherein said securing fixture comprises a securing block that has an arched base surface with an arched contour which fits conformingly onto an outer surface of said first inner pipe, and that has an outer surface which is opposite said base surface and in which said at least one internally threaded hole is provided.

4. The double-walled pipe connection arrangement according to claim 1, wherein said first pipe connection member is a sleeve-shaped outer pipe bushing, and said at least one throughhole includes two throughholes that extend through a sleeve wall of said sleeve-shaped outer pipe bushing respectively along or parallel to said radial line.

5. The double-walled pipe connection arrangement according to claim 1, wherein said second pipe connection member is an outer pipe sleeve.

6. A double-walled pipe connection arrangement comprising:

a first inner pipe that has a first junction end, and that extends along a longitudinal pipe axis;

a first outer pipe that has a first outer pipe end, and that is arranged surrounding at least a portion of said first inner pipe;

a second inner pipe that has a second junction end releasably joined to said first junction end of said first inner pipe;

a second outer pipe that has a second outer pipe end, and that is arranged surrounding at least a portion of said second inner pipe;

a securing fixture that is fixedly arranged on said first inner pipe between said first junction end and said first outer pipe end;

a first outer pipe connection sleeve that surrounds said securing fixture and a portion of said first inner pipe between said first outer pipe end and said first junction end, and that is secured to said securing fixture; and a second outer pipe connection sleeve that surrounds said joined first and second junction ends of said first and second inner pipes;

wherein said first outer pipe connection sleeve and said second outer pipe connection sleeve are releasably joined to each other by a plug-in connection without any screws, and wherein said plug-in connection can be released by axially sliding said first and second outer pipe connection sleeves relatively apart to disengage said plug-in connection without having to release any mechanical fastener.

7. A double-walled pipe connection arrangement comprising:
- a first inner pipe that has a first junction end, and that extends along a longitudinal pipe axis;
- a first outer pipe that has a first outer pipe end, and that is arranged surrounding at least a portion of said first inner pipe;
- a second inner pipe that has a second junction end releasably joined to said first junction end of said first inner pipe;
- a second outer pipe that has a second outer pipe end, and that is arranged surrounding at least a portion of said second inner pipe;
- a securing fixture that is fixedly arranged on said first inner pipe between said first junction end and said first outer pipe end;
- a first outer pipe connection sleeve that surrounds said securing fixture and a portion of said first inner pipe between said first outer pipe end and said first junction end, and that is secured to said securing fixture; and
- a second outer pipe connection sleeve that surrounds said joined first and second junction ends of said first and second inner pipes;
- wherein said first outer pipe connection sleeve is releasably joined to said first outer pipe end, said second outer pipe connection sleeve is releasably joined to said first outer pipe connection sleeve, and said second outer pipe connection sleeve is slidably joined onto and circumferentially around said second outer pipe end; and
- wherein said first and second outer pipe connection sleeves are not secured to each other by fasteners in a final assembled, operable condition of said double walled pipe connection arrangement.

8. The double-walled pipe connection arrangement according to claim 7, wherein said first outer pipe connection sleeve includes a female plug-in end, said second outer pipe connection sleeve includes a male collar end, and said female plug-in end is plugged into said male collar end to releasably join said first and second outer pipe connection sleeves to each other.

9. The double-walled pipe connection arrangement according to claim 7, wherein said first outer pipe connection sleeve has an outer sleeve surface and a grounding lug that integrally protrudes radially outwardly from said outer sleeve surface and that has a hole therein, and further comprising a grounding and mounting screw screwed into said hole in said grounding lug in a direction parallel to said pipe longitudinal axis.

10. A double-walled pipe connection arrangement comprising:
- a first inner pipe that has a first junction end, and that extends along a longitudinal pipe axis;
- a first outer pipe that has a first outer pipe end, and that is arranged surrounding at least a portion of said first inner pipe;
- a second inner pipe that has a second junction end releasably joined to said first junction end of said first inner pipe;
- a second outer pipe that has a second outer pipe end, and that is arranged surrounding at least a portion of said second inner pipe;
- a securing fixture that is fixedly arranged on said first inner pipe between said first junction end and said first outer pipe end;
- a first outer pipe connection sleeve that surrounds said securing fixture and a portion of said first inner pipe between said first outer pipe end and said first junction end, and that is secured to said securing fixture; and
- a second outer pipe connection sleeve that surrounds said joined first and second junction ends of said first and second inner pipes;
- wherein said first outer pipe connection sleeve is releasably joined to said first outer pipe end, said second outer pipe connection sleeve is releasably joined to said first outer pipe connection sleeve, and said second outer pipe connection sleeve is slidably joined onto and circumferentially around said second outer pipe end; and
- excluding fasteners oriented parallel to said longitudinal pipe axis for joining together any of said first outer pipe connection sleeve, said second outer pipe connection sleeve, said securing fixture, said first outer pipe and said second outer pipe in a final, assembled, operable condition of said double walled pipe connection arrangement.

11. The double-walled pipe connection arrangement according to claim 10, further comprising at least one screw that extends along or parallel to a radial line extending radially from said longitudinal pipe axis, and that secures said first outer pipe connection sleeve to said securing fixture.

12. A double-walled pipe connection arrangement comprising:
- a first inner pipe that has a first junction end, and that extends along a longitudinal pipe axis;
- a first outer pipe that has a first outer pipe end, and that is arranged surrounding at least a portion of said first inner pipe;
- a second inner pipe that has a second junction end releasably joined to said first junction end of said first inner pipe;
- a second outer pipe that has a second outer pipe end, and that is arranged surrounding at least a portion of said second inner pipe;
- a securing fixture that is fixedly arranged on said first inner pipe between said first junction end and said first outer pipe end;
- a first outer pipe connection sleeve that surrounds said securing fixture and a portion of said first inner pipe between said first outer pipe end and said first junction end, and that is secured to said securing fixture; and
- a second outer pipe connection sleeve that surrounds said joined first and second junction ends of said first and second inner pipes;
- wherein said first outer pipe connection sleeve is releasably joined to said first outer pipe end, said second outer pipe connection sleeve is releasably joined to said first outer pipe connection sleeve, and said second outer pipe connection sleeve is slidably joined onto and circumferentially around said second outer pipe end; and
- excluding radial flanges protruding along radial planes outwardly from any of said first outer pipe connection sleeve, said second outer pipe connection sleeve, and on said first or second inner pipes spaced away from said first and second junction ends thereof.

13. A double-walled pipe connection arrangement comprising:
- a first inner pipe that has a first junction end, and that extends along a longitudinal pipe axis;
- a first outer pipe that has a first outer pipe end, and that is arranged surrounding at least a portion of said first inner pipe;
- a second inner pipe that has a second junction end releasably joined to said first junction end of said first inner pipe;
- a second outer pipe that has a second outer pipe end, and that is arranged surrounding at least a portion of said second inner pipe;
- a securing fixture that is fixedly arranged on said first inner pipe between said first junction end and said first outer pipe end;
- a first outer pipe connection sleeve that surrounds said securing fixture and a portion of said first inner pipe between said first outer pipe end and said first junction end, and that is secured to said securing fixture;
- a second outer pipe connection sleeve that surrounds said joined first and second junction ends of said first and second inner pipes; and
- at least one screw that extends along or parallel to a radial line extending radially from said longitudinal pipe axis, and that secures said first outer pipe connection sleeve to said securing fixture;
- wherein said first outer pipe connection sleeve is releasably joined to said first outer pipe end, said second outer pipe connection sleeve is releasably joined to said first outer pipe connection sleeve, and said second outer pipe connection sleeve is slidably joined onto and circumferentially around said second outer pipe end.

* * * * *